United States Patent
Yananton

Patent Number: 4,869,204
Date of Patent: * Sep. 26, 1989

[54] ODORLESS ANIMAL LITTER UNIT HAVING SECURING MEANS

[76] Inventor: Patrick Yananton, 1518 Little Hill Rd., Point Pleasant, N.J. 08742

[*] Notice: The portion of the term of this patent subsequent to Feb. 3, 2004 has been disclaimed.

[21] Appl. No.: 870,590

[22] Filed: Jun. 4, 1986

Related U.S. Application Data

[63] Continuation-in-part of Ser. No. 573,958, Jan. 26, 1984, Pat. No. 4,640,225, which is a continuation-in-part of Ser. No. 315,307, Oct. 27, 1981, Pat. No. 4,469,046, which is a continuation-in-part of Ser. No. 909,256, May 24, 1978, abandoned.

[51] Int. Cl.$^4$ ............................................. A01K 29/00
[52] U.S. Cl. ............................................. 119/1
[58] Field of Search ............................................. 119/1

[56] References Cited

U.S. PATENT DOCUMENTS

| | | | |
|---|---|---|---|
| 3,227,137 | 1/1966 | Goldman et al. | 119/1 |
| 3,233,588 | 2/1966 | Thomas | 119/1 |
| 3,284,273 | 11/1966 | Prentice | 119/1 |
| 3,358,647 | 12/1967 | Wilson | 119/1 |
| 3,521,624 | 7/1970 | Gander et al. | 119/1 |
| 3,684,155 | 8/1972 | Smith | 119/1 |
| 3,809,013 | 5/1974 | Rigney et al. | 119/1 |
| 3,890,930 | 6/1975 | Clark | 119/1 |
| 4,308,825 | 1/1982 | Stepanian | 119/1 |
| 4,469,046 | 9/1984 | Yananton | 119/1 |
| 4,494,482 | 1/1985 | Arnold | 119/1 |
| 4,616,598 | 10/1986 | Burniski et al. | 119/1 |
| 4,640,225 | 2/1987 | Yananton | 119/1 |
| 4,646,685 | 3/1987 | Arenz | 119/1 |

FOREIGN PATENT DOCUMENTS 8100504  3/1981  PCT Int'l Appl. ..................... 119/1

*Primary Examiner*—David A. Scherbel
*Assistant Examiner*—Caroline D. Dennison
*Attorney, Agent, or Firm*—Sheldon H. Parker

[57] ABSTRACT

A claw resistant sorbent pad laminate is employed for the collection of animal urine. The laminate includes a bottom sheet layer of moisture impermeable material, an intermediate sorbent layer of material having a high sorbency capacity for urine, a top claw resistant screen means. The laminate is secured to a container by means of securing means around the periphery of the bottom sheet layer. In one emodiment of the invention the securing means is an elasticized area or areas around the periphery of the moisture impermeable material. In an alternate embodiment a drawstring is movably affixed to the periphery of the bottom sheet layer.

28 Claims, 3 Drawing Sheets

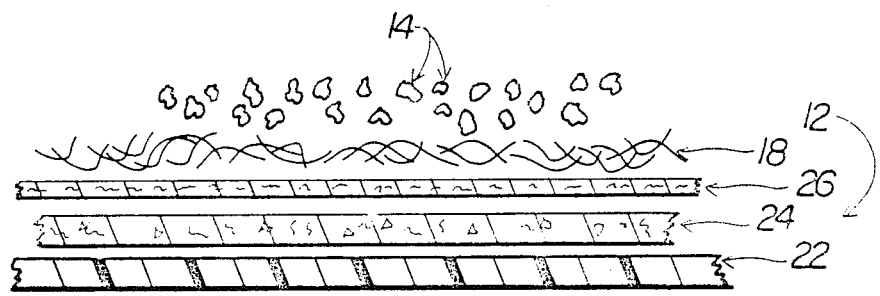
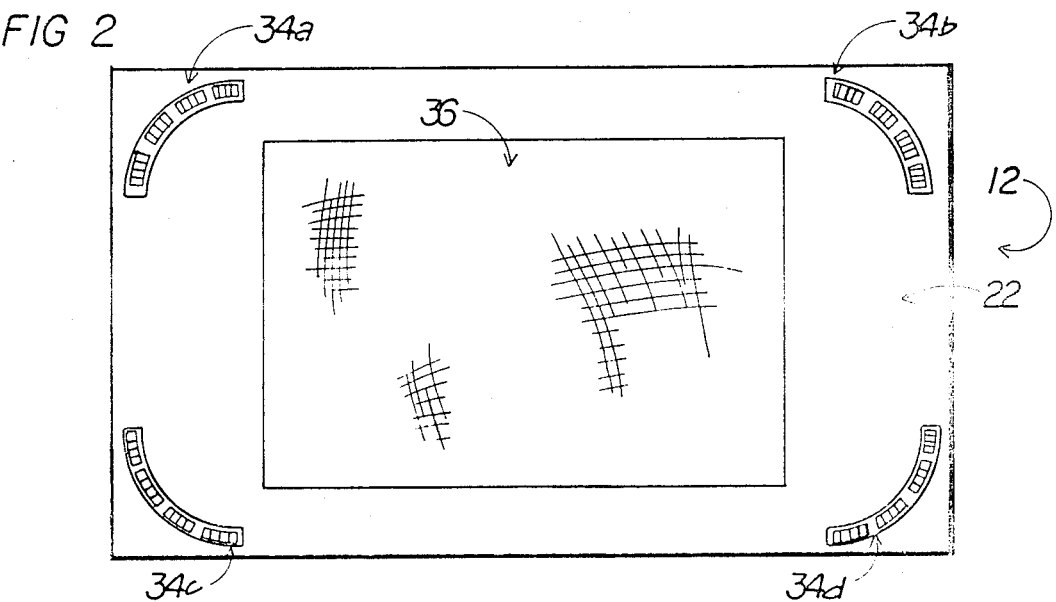
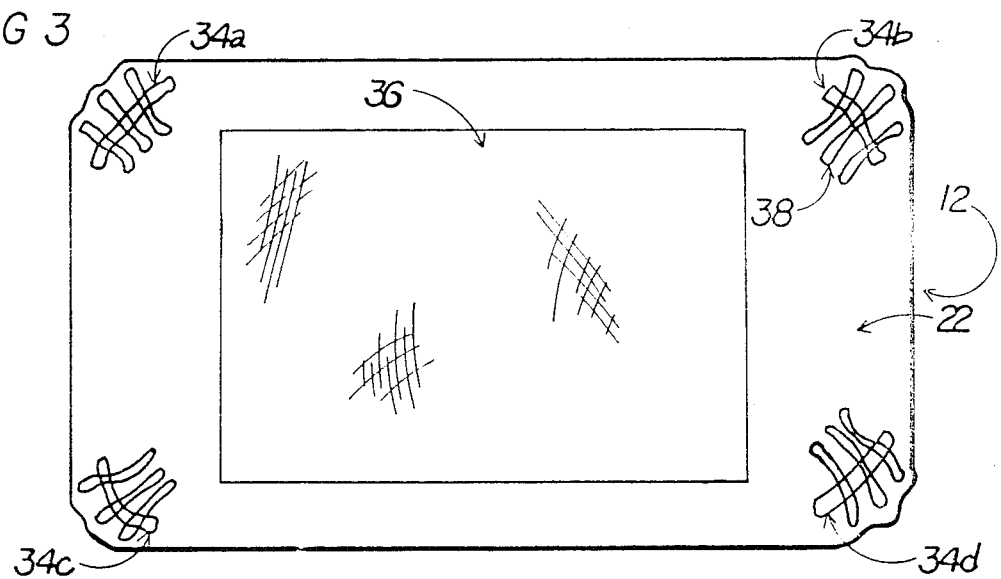

ODORLESS ANIMAL LITTER UNIT HAVING SECURING MEANS

CROSS REFERENCE TO RELATED APPLICATION

This application is a continuation-in-part of patent application Ser. No. 573,958, filed Jan. 26, 1984 issued Feb. 3, 1987 as Pat. No. 4,640,225, which is a continuation-in-part of application Ser. No. 315,307, filed Oct. 27, 1981, now U.S. Pat. No. 4,469,046, which is a continuation-in-part of Ser. No. 909,256, filed May 24, 1978, now abandoned, the subject matter and description of which is incorporated herein by reference thereto, as though set forth herein in detail.

BACKGROUND OF THE INVENTION

1. Field of the Invention

This invention relates to improvements in a unique odor preventing, disposable, sorbent pad-liner for an animal litter unit, and more particularly to an improved combination of screening and sorbent padding with a elasticised or draw string tightened thermoplastic liner to be utilized in combination with a litter box.

2. Brief Description of the Prior Art

Many domestic animals frequently use litter boxes for the elimination of body wastes. The boxes are usually filled with various kinds of sorbent granular materials such as sand, cat litter and the like, and must be periodically emptied and cleaned, which are somewhat objectionable tasks, since the sorbent granular material must be replaced and the boxes cleaned each time.

Cats, being the most frequent users of litter boxes, present a further problem in that the urine of the feline contains the highest content of urea which, when allowed to stand for any length of time in any litter material, releases an ammonia odor. This odor is one of the more objectionable factors in the ownership of a cat.

In order to eliminate the odor caused by cat urine, the litter box must be changed frequently, this being an expensive, laborious and messy job.

Many patents have issued on devices for the indoor use by cats, such as U.S. Pat. No. 3,233,588. The invention disclosed in this patent employs the use of a screen which is placed on top of the cat litter. This patent does ease the problem of animal excrement, by merely lifting the screen and disposing of the feces lying on top, it does not however, contend with the problem of the odor created by the urine. The unit must be periodically emptied of its sorbent granules and thus only partly contents with the elimination of the mess and labor involved. U.S. Pat. No. 3,809,013 is similar, except that a stack of liners is placed under the litter. When the litter becomes soiled, the liner is lifted, the litter filters through screen covered holes in the center of the liner and the litter is reused with the next liner. Again, the excrement is disposed of neatly, however the odor problem remains.

U.S. Pat. No. 3,284,273 discloses an absorbent pad which can be used in combination with animals. Although this pad does contain absorbent capabilities, the odor from the urine of the animal is trapped, much as in the standard cat litter. The pad is not designed for repetitive, long term use in a cat box but rather to retain the urine in a disposable pad, by mopping up pools of urine left on floors or in cages, etc.

U.S. Pat. No. 3,476,083 discloses the use of deodorizing substances which are placed in the bottom of the receptacle. A screen is placed a short distance above, on which lies the standard kitty litter. The upper compartment receives the solid and liquid excreta, retains the solids and absorbs the bulk of the liquid allowing the excess liquids to drain through to the lower compartment. Although providing some neutralizing of the ammonia odor by deodorizing the urine which cannot be sorbed by the litter, it does not provide an effective means for deodorizing the bulk of the urine which has been trapped in the litter. The disposal of all the litter creates a substantial expense to the owner and the cleaning of the lower compartment would be unpleasantly laborious and rather messy. The spilling of the deodorizing substances (lime is suggested) would be objectionable as well as possibly harmful to the person handling the container if by chance some of the chemical substance was to come in contact with the skin.

U.S. Pat. No. 3,752,121, Brazzell, discloses a tray which holds a absorbent mat covered with artificial grass. "Below the artificial grass 31 and its backing sheet 32 there is provided a liquid absorbing pad 33 which may be composed of a plurality of layers of absorbent paper and/or a pad of absorbent fibers to absorb any liquid which seeps through the apertures in the artificial grass backing sheet." The Brazzell patent also recommends using a deodorizer after the animal has used the unit (deodorizer included with the unit at time of purchase). The purpose of the Brazzell absorbent layers is to hold the urine, encasing it between a bottom "impervious layer" and a top "nonabsorbant or impervious layer" of artificial grass. The trapment of the urine allows for bacteria to grow, causing odor. This bacteria growth prevents use of the pad for long periods of time.

While many additional patents could be cited regarding other variations of disposal systems, types of granular litter and containers none of these patents overcome both the problem of odor and easy, economical and convenient disposal and replacement. By way of contrast, U.S. Pat. No. 4,469,046, of which this is a C.I.P., discloses and claims an effective means for handling the foregoing problems. However, it has been found that the absorbent pad of the aforenoted patent is not as neat and effective in a standard litter box as it is in the litter box disclosed in the aforenoted patent.

SUMMARY OF THE INVENTION

In the instant invention the foregoing problems are overcome through the use of an, odorless, disposable sorbent pad which is adapted to be secured to a standard litter box or container. The sorbent pad structure has a protective screening and a moisture impermeable liner on either side of a sorbent pad with the length and width of the sheet layer of moisture impermeable material substantially greater than that of the screen and sorbent pad. The moisture impermeable material can be treated to provide an elastic region at least at the corners allowing for a non-slip fit on standard litter boxes and containers or alternatively, can be provided with a draw string mechanism to achieve the securing of the sorbent pad means to a litter box.

BRIEF DESCRIPTION OF THE DRAWINGS

The advantages and objects of the invention will become apparent and the invention will be more fully understood from the following specification, particularly when read in conjunction with the drawings, wherein:

FIG. 1 is an exploded fragmentary side view of the sorbent pad of the instant invention;

FIG. 2 is a top view of the sorbent pad of FIG. 1 prior to being elasticised;

FIG. 3 is a top view of the sorbent pad of FIG. 1 after it has been elasticised;

DETAILED DESCRIPTION OF THE INVENTION

Figure 5:
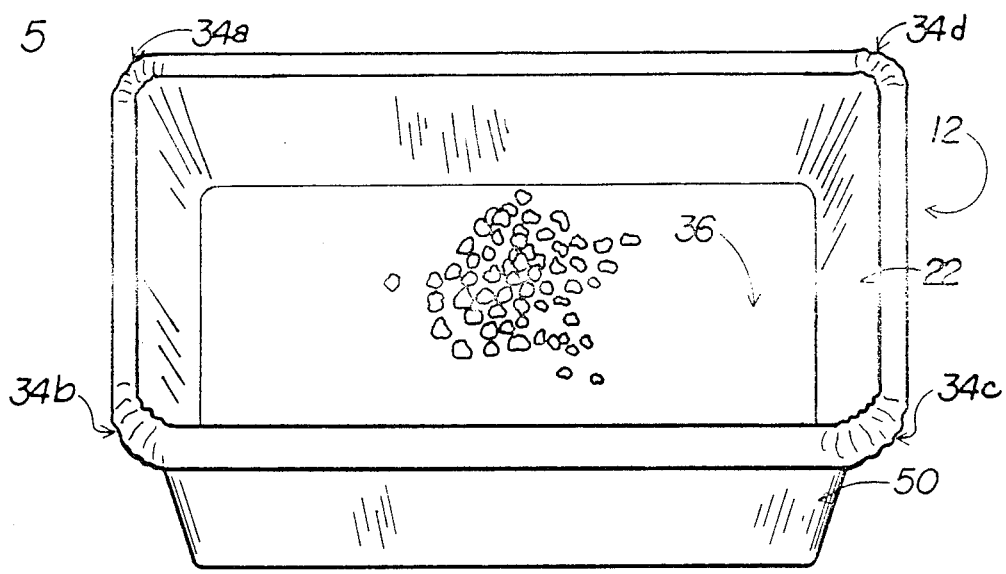
FIG. 5 is a perspective view of a litter box with the sorbent pad.

In order to provide a clear understanding of the instant invention, the various aspects of the invention are hereinafter described in detail.

GRANULAR MATERIAL 20

The granular material as employed in the instant invention is utilized to satisfy the digging instinct of the animal and therefore need not provide sorptive qualities. Consequently, inexpensive materials, such as clay, can be used in accordance with individual preferences. Unlike the commonly employed systems in which the granular material must be used in quantity to provide the required sorptive qualities and digging qualities, minimal quantities of the granular material can be used. The sorption quality (absorption and/or adsorption) of the layer 24 can provide the total or the predominant desiccation effect. It should be noted that the terms sorption, absorption and adsorption are used interchangeably since the exact sorption phenomena is not narrowly critical.

The litter material is commonly in granular form and must be in moisture transfer contact with the underlying sorbent material so that the urine can be drawn from the litter material into the sorptive layers. The use of a surfactant on the screen material can enhance the moisture transfer capability of the screen and is essential in combination with hydrophobic or low hydrophilicity materials. The particle size distribution can range between 5.6 to 1 mm, corresponding to U.S. Series Standard Sieve opening #3 ½ to #18. Smaller particles exist within the litter down to the size of dust, but do not adversely effect the primary function of the particles or adversely effect the sorptive material. Transport of the liquid across the screen can actually be enhanced by the presence of the small particles which are aesthetically undesirable but functionally acceptable.

ABSORBENT UNIT 12

The sorptive elements can be any material such as paper, tissue, pulp starch and related polymers, etc. which can disperse the liquid quickly, thus providing a large surface area for evaporation of moisture. In order to maintain a moisture free environment, it is necessary to evaporate from 5 to 20 ml. of liquid each time the system is used by the cat.

Examples of sorbent materials are those manufactured by Dow Chemical and marketed under U.S. Pat. No. 4,117,184. The instant patent application incorporates by reference thereto, as though set forth in detail herein the description in U.S. Pat. No. 4,117,184 of a product commonly identified as a super absorbent and sold by Dow Chemical Company under the designation DWAL 35 R. The Dow Chemical product is available as a laminate which includes at least a tissue layer and a polymer film layer. The Dow Chemical laminate has an indicated minimum liquid absorbency capacity of 28 grams per gram of laminate.

Alternatively, the super absorbent can be a material such as the National Starch and Chemical Corporation product sold under the registered trademark PERMASORB. The National Starch product is a hydrophilic polymer which has the ability to absorb and hold urine. There is a significant reduction in urine odor and pH level in the presence of PERMASORB.

Another example of an absorbent is the material sold under the trademark WATER-LOCK by Grain Processing Corp.

A ground paper pulp absorptive material has been found to provide a combination of high absorbency, high surface area and low cost. The large surface area provides for rapid urine evaporation and consequently is extremely effective in odor prevention.

Toxic chemicals or biologically active ingredients are not only unnecessary but preferably are avoided. U.S. Pat. No. 4,494,482 assigned to Proctor and Gamble relies on the use of 5000 to 30,000 ppm of a halogenated aromatic hydrocarbon bacteriostat in an absorbent pad to effectively control odor development. It has been found that if the sorbent material has the ability to sorb the urine, distribute the urine rapidly throughout its mass, and evaporate the urine faster than the bacteria can act on the urine, then the additives are not only unnecessary but undesirable.

Bacteria from the feces cannot grow in the sorptive layer because they are dried out and die or become dormant. It is the bacteria which is capable of breaking down the urine which cause the strong volatile odor commonly associated with cat litter boxes, the dry environment of the sorbant material effectively prevents odor. The high absorption capacity of the super absorbant polymers, such as available from Dow Chemical, do not provide an advantage over a pulp fiber, due to the high rate of evaporation of urine from the fiberous material. As previously stated, the instant invention requires substantially less granular material for each use and requires fewer changes, saving further on granular use. In the prior art type of litter box, the litter consumption is greater than in accordance with the present invention.

The amount of litter which is used can be decreased with time in order to permit the cat to become accustomed to the low litter level. In some cases, cats can be trained to the pads without litter. Whereas, in conventional litter boxes, two to three inches of litter are required, in accordance with the present invention less than one inch of litter, and preferably no more than about one half inch, provides the desired results.

SCREEN MATERIALS 19

A flexible, screen like mesh or permeable or semipermeable membrane is utilized to prevent the animal from clawing through to the sorbent layer. The screen material must, therefore, exhibit sufficient strength to with stand the clawing action of the animal. Even though the screen is disposable, it is critical that the screen be made of a material which is relatively inert to urine thereby preventing rapid corrosion of the screen material, resultant odors and chemical activity. Some of the preferred materials of construction include polyester and polypropylene. Particularly in the case of hydrophobic materials, a surfactant must be used to prevent the screen from acting as a liquid transfer barrier. While the particular surfactant which is used is not narrowly critical, by way of illustration the surfactant can be a non-ionic surfactant such as Tergitol. The mesh-like screen or netting 19 can be formed by the spun bonding process as well known in the art. While it would appear that screens formed by this process would not be capable of providing the required claw rip resistance without resorting to such a high material density that moisture transfer would be either precluded or severely restricted and cost would be excessive, it has been found that a critical balance of properties can be achieved. At the upper limit, the hole size is so small as to interfere with liquid transfer. At the lower limit, the hole size is so large that the protective ability becomes inadequate. The lower plastic liner must be protected from the cats claws since even pin holes can cause urine to seep under the liner and causing a severe odor problem. Similarly the sorptive layer must be protected from the tearing action of the claws. For example, the screen of Vander Wall, 3,476,083, would be totally inoperative to prevent tearing of the sorptive layer or the plastic moisture barrier.

The use of a loose screen-like fabric is unacceptable because the mesh can be varied as a result of the force of the animal's claws. Accordingly, the reference to mesh size is intended to indicate the effective size under actual use conditions rather than a 'temporary' size which can be readily altered by the animal.

Structural integrity of the screen can be achieved by any of the known means which yields bonding of the strands at their intersections, as for example, through fusion of strands at the cross-over points or through the weaving or knitting of the strands or any other means which precludes relative movement of the strands.

Nonwovens, as applicable to the instant application, must meet specific standards in the following areas: abrasion resistance, air permeability, burst strength, tear strength, repellency, and chemical and environmental resistance. The fabric used in the instant invention requires a high abrasion resistance to avoid the fabric from pilling or wearing thin in certain sections. The criteria of the bursting strength and tear strength are important to prevent ripping. The pressure exerted by an animal, especially by a cat, can put stress on the fabric in diagonal, horizontal and vertical directions simultaneously. If the protective screen is torn, the animal has access to the urine filled sorbent layer. The sorbent layer must be allowed to dry out and the bacteria should be aerated to the maximum extent. Thus, the air permeability of the fabric is critical as air is required to prevent the accumulation of liquid urine and its odor, through evaporation and the maintenance of an aerobic environment. The liquid repellency of the fabric allows all the urine to pass through the fabric onto the sorbent layer and prevents the urine from being sorbed into the fabric. The chemical and bacteria, etc. repellency of the fabric prevents the corrosion of the fabric by the urine as well as bacteria build up within the fabrics.

The weight per mil of fabric is an important factor to regulate in order to prevent the fabric from adding unnecessary weight and cost to the litter pad unit. However it is an indication of the fabric strength and cannot be compromised in an effort to reduce weight of the unit. The minimum thickness would be about 2.5 mils, with a maximum requirement of about 7 mils. The preferred weight would be between 80 and 170 grams per square yard, the mil to gram ratio would naturally vary depending upon the fabric or screening used.

The process used to form the nonwoven can be any of the known processes, such as dry formed, wet formed, melt blown, thermal bonded, etc. however the spunbonded and spunlaced tend to come closest to meeting the criteria of the instant invention. Detailed information is disclosed in a co-pending application.

FIG. 1 shows, in exploded form, a cross-section of the layers which form the sorbent unit 12. The outer layer 22 which is a thin plastic sheet of a material such as polypropylene or polyethylene prevents waste from making contact with the box and doubles as a bag when disposing of the soiled litter. The sorbent layer 24 is formed from a sorbent material as previous stated herein.

The optional protective layer 26 is made from a durable, non-woven tissue substance. In addition to the protective layer 26, there can be an additional layer of protective material. If a binder is used for either the fabric of the tissue layer or other layer, it must be of a non-water soluble material. The protective screen 28 is of a flexible, durable substance which prevents the animal from scratching through to the bottom layers. The granular material 20 is placed on top of the absorbent unit as previously described herein.

FIG. 2 illustrates the sorbant pad unit 12 with the elasticised corners 34a, b, c and d in a pretreated condition. The outer layer 22 is constructed substantially larger than the sorbent section 36. The sorbent section 36 is comprised of the sorbent unit 12 layers excluding the outer layer 22. The exact proportions can be determined at time of manufacture and would be dependent on the approximate size of the box (small, medium or large) that the sorbent unit 12 is to be used in, as well as how exact the desired fit. The use of elastic allows for a greater size discrepancy between the outer layer 22 and the box or container with which it is to be used. The sorbent section 36 is adhered to the outer layer 22 as taught in the foregoing patents and applications, of which this is a Continuation in Part.

As previously stated, in order to provide a "custom" fit the corners of the outer layer 22 have been elasticised. It has been found that certain thermoplastic materials, when specially treated or conditioned, can obtain a high degree of elasticity nearly approaching that of natural and synthetic commercial rubber and that such materials can be treated only at certain parts thereof to give spot elasticity if so desired. Thus, a specified quantity of such material, such as a sheet, can be area conditioned so as to make that area highly elastic while the rest thereof remains relative inelastic.

It is generally characteristic of adaptable thermoplastics in their pretreated condition that they be able to be formed into a heat shrinkable material, have at least some small amount of rubbery or elastic quality in their natural or unoriented state, and have adequate strength which can be substantially increased by orientation or irradiation, or by both. Some thermoplastic materials having these characteristics are described in detail in British Pat. Nos. 866,819; 866,820; 866,821 and 866,822, all issued to W. R. Grace & Company, bearing a complete specification published date of May 3, 1961. Generally these patents relate to the forming of polyolefin films having the required heat shrink properties. It is a noted characteristic of such films that as the amount of orientation increased therein so does their ability to become elastic increase when specially treated.

To increase the amount of orientation, irradiation is extremely beneficial particularly when dealing with homopolyethylenes and the like, as suggested in aforementioned British Patent No. 866,820. Another patent to W. R. Grace & Company, Belgian Patent No. 575,277, dated February 7, 1958, also relates to a process for establishing a substantially increased amount of orientation in certain thermoplastics by an irradiation process. For example, the process as outlined in the Belgian patent for so treating polyethylene generally comprises irradiating the film 6 with a dose of at least $2 \times 10$ REP, heating the irradiated material, biaxially orienting the irradiated material when in the heated state, and then cooling the film before relaxing the orientation tensions. Of course, it is to be understood that the above sequence of steps need not necessarily be followed just as indicated to establish an adequate thermoplastic material for further treatment in accord with the principles of the present invention, and that it is only set forth as a representative process of pretreating the material to place it in condition for such additional treatment.

In such further treatment, according to the present invention and discussed in more detail hereinafter, it has been found that certain heating and cooling steps produce the desired elastic qualities in properly pretreated thermoplastic film materials, as discussed previously. Thus, it has been found that an additional application of heat to the pretreated film materials should be under pressure and should be generally of a quantity sufficient enough to relieve orientation stresses in the film and less than that required to make the film molten. Immediately after the proper quantity of heat is applied, it also has been found that it is important to remove the pressure so as to permit the further treated film to cool without being under pressure. The amount of heat used in a given application is directly related to the period of that application, as will be illustrated hereinafter in specific examples.

For instance, heat was applied less than one second, followed by an immediate release of the application of heat and any pressure. This resulted in a heat shrunk spot or area which when so treated, instead of being non-flexible at its shrunk area, became elastic almost to the degree common with natural rubbers and the like. However, it is to be noted that the relation between heat sealing and shrink temperatures varies considerably for different thermoplastics such that the proper elastic heat shrink might be obtainable in other thermoplastic films at or even above their heat seal temperatures, depending also on the period of heat application. It is further noted that the period of heat application can vary, as does the thickness of the film concerned, thicker films requiring a greater period to achieve elastic heat shrinkage. It can be readily seen that numerous applications of so treated film materials can be had in such items as infants' garments, shower caps, sleeves for wet compresses, bowl covers, rain jackets, basket liners, boots, counter top dust protectors, etc., where the protecting film material requires an elastic character around a portion thereof. Most of the testing done has been with ethylene polymers, that is thermoplastic films including polyethylene or a copolymer of 50 percent or more ethylene. For example, a blown, extruded, irradiated, oriented film of polyethylene resin was used. Also used was a copolymer of ethylene and vinyl acetate, and a copolymer of ethylene and ethyl acrylate. The most extensive tests were employed using the aforementioned copolymers and it was found that they obtained an unusually high degree of elasticity when treated according to the process of the present invention. The forming of such copolymers is well known, and for a specific method of making a copolymer of ethylene reference can be had to U.S. Pat. No. 2,200,429, issued May 14, 1940 to M. W. Perrin et al, and to U.S. Pat. No. 2,953,551, issued Sept. 20, 1960 to W. G. White. Of course, it is understood that after the copolymer is so formed and made into a film (by any well known process such as described for example in U.S. Pat. No. 2,941,254, issued June 2, 1960 to I. Swerlick) it should be pretreated by a process similar to that described in aforementioned co-pending Belgian Pat. No. 575,277, or British Pat. No. 866,820, to provide proper orientation in the resulting film.

U.S. Pat. No. 3,245,407 discloses the use of the thermoplastics of W. R. Grace & Company, and other aforenoted patents, to specifically create elasticised sections of an article. This patent pertains generally to the manufacture of disposable diapers and the like with elasticised waists and legs.

Although the technology in the foregoing patents has been primarily limited to devices which require body contour conformation, it has now been discovered that the technology can be adapted to the securing of a sorbant pad unit to a litter container. After treatment as noted above, the sorbent unit 12 of FIG. 2 is gathered as illustrated in FIG. 3. The treatment of the elasticised corners 34a, b, c and d causes the outer layer 22 to pull together along these areas, creating gather lines 38. The sorbent unit 12 can be temporarily expanded to its pretreated size and shape by pulling the elasticised corners 34a, b, c and d straight, however it will promptly return to its treated configuration.

Figure 4:
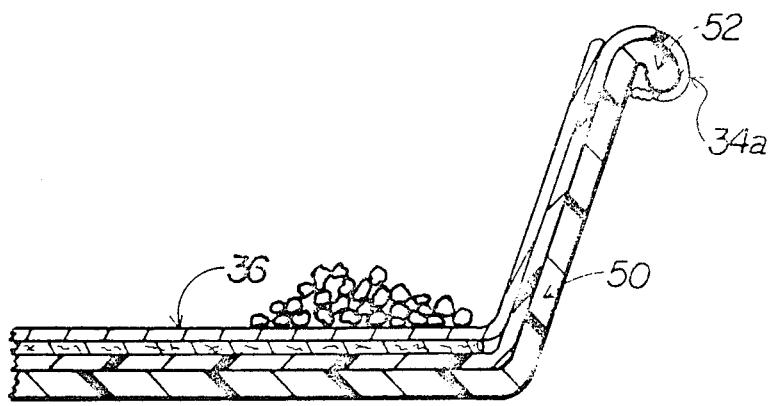
FIG. 4 is an exploded fragmentary side view of a box of the instant invention fitted with the pad of FIG. 1.

The elasticised sorbent unit 12 can be neatly fitted around the base 50 of a litter box, as illustrated in FIG. 4. The outer layer 22 is stretched at its elasticised corners 34a, b, c and d, one at a time, and placed over the corresponding corner of the base 50. Because of the pull of the elasticised corners 34a, b, c and d, the edges of the outer layer 22 is forced to fit tightly around the base 50. Many commercial litter boxes are manufactured with a "lip" 52 at their top edges and the sorbant unit 12 will fit easily under the lip 52 preventing slippage. To obtain optimum results, the sorbent layer 36 should extend somewhat beyond the bottom of the base 50 thereby resting on the walls. This prevents the cat from puncturing the outer layer 22 during scratching as well as a "buffer" to sorb urine if the cat urinates along the edge of the litter box. As an alternative to the above treated areas, the entire edge of the outer layer 22 can be treated so as to be elasticised, however this would be substantially more expensive to manufacture while providing little or no advantages in this embodiment.

FIG. 5 shows the sorbant unit 12 placed on the base 50. The elastic corners 34a, 34b, 34c and 34d pull the outer layer 22 in around the corners of the base 50 preventing the sorbent unit 12 from slipping off of the lip 52 of the base 50.

Figure 6:
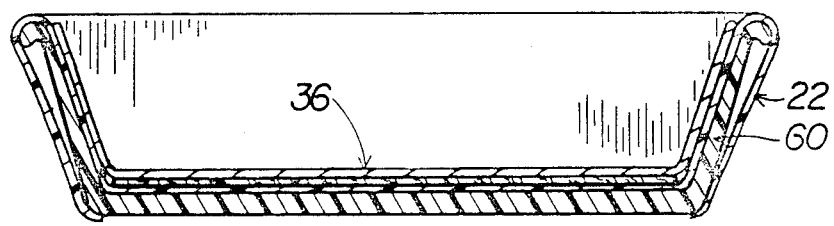
FIG. 6 is side view, in cross-section, of an alternate embodiment of the instant invention.

An alternative method to use the sorbant unit 12 with common commercial or non-standard boxes without lips is illustrated in FIG. 6. The outer layer 22 is manufactured at a size which would allow the outer layer 22 to be gathered under the straight sided box in a "shower cap" fashion. This would prevent the slippage of the sorbant unit 12 from the box and could be utilized with a standard cardboard box or like receptacle.

Figure 7:
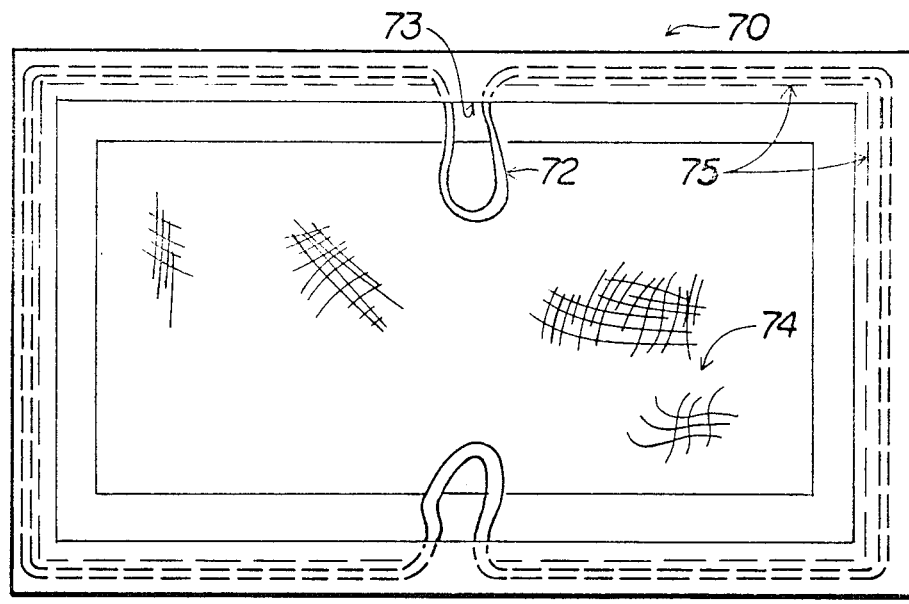
FIG. 7 is a top view of an alternate embodiment of the instant invention utilizing a drawstring.

In the alternate embodiment illustrated in FIG. 7, the sorbant pad unit 70 is provided with the drawstring 72 which extends around the periphery of the outer layer 76. The drawstring 72 is movably affixed to the outer layer 76 as known in the art, the most common of which is to form an extended tunnel or tubular pocket region. This can be accomplished by folding over peripheral edges sections and heat sealing at various points 75 at the outer edges, leaving at least one opening 73, with the drawstring 72 running through the pocket and extending out of the opening, or at least being accessible through the opening. The construction of the sorbent pad 70 is identical to that of the sorbent pad unit 12 described, with the replacement of the elastic 34 with the drawstring 72. The sorbent pad 70 would fit over a litter container in the same manner as the elasticised unit illustrated in FIG. 4 except that the drawstring would be utilized to tighten the outer layer 76 about the litter box.

Figure 8:
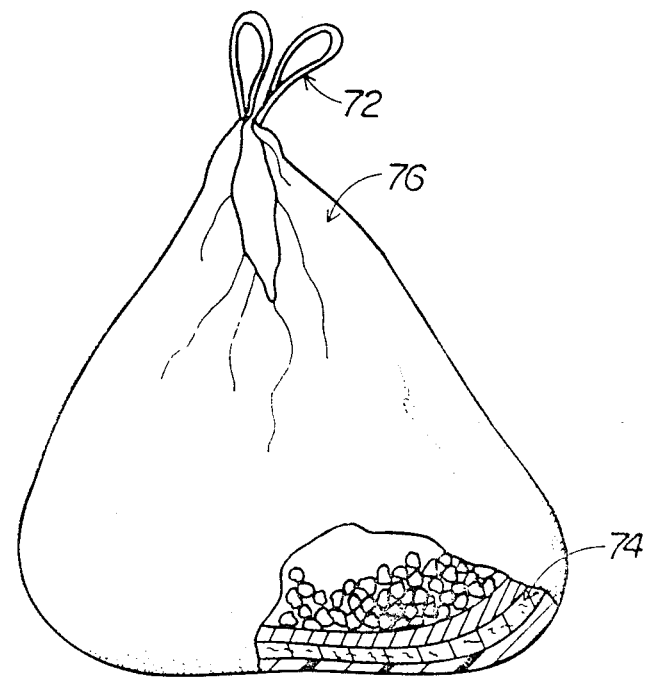
FIG. 8 is a cutaway side view of the embodiment of FIG. in a gathered position.

FIG. 8 illustrates the drawstring tightened, thereby pulling the edges of the outer layer 76 in to form a bag. As illustrated, the sorbent pad and screen 74, along with the litter, are enclosed within the newly formed bag. Because of the unique construction of the sorbent pad as disclosed in FIG. 1 and the subsequent reduction in litter use, a heavy gauge plastic is not required. The quantity of litter used in prior art litter boxes could range as high as five pounds to be effective and to dispose of this quantity of litter in this manner would require a heavy gauge plastic. In the instant invention the litter use would be less than one pound, eliminating the need for the heavy gauge plastics. Additionally, the equivalent device using prior art methods would be subject to puncture by the cat's claws, negating much of the value of the unit. In the instant invention, the plastic bottom layer 76 is protected when in the litter box from a cat's claws by the protective screen. The drawstring allows for an easy to use unit, both in assembly and disposal.

What is claimed is:

1. In a sorbent pad laminate for the collection of animal urine, comprising in combination;
   a. a bottom sheet layer of moisture impermeable material,
   b. an intermediate sorbent layer of material having a high sorbency capacity for urine;
   c. a top claw resistant screen means, said screen means being a urine permeable, flexible member of material which is substantially inert to urine, formed of strands having sufficient tear strength to withstand the clawing action of a cat and sufficiently small hole size to protect said sorbent layer and said sheet layer of moisture impermeable material from being torn by animal claws,
   said bottom sheet layer and said top screen means being bonded to each other along at least a substantial portion of the periphery of said screen means; the improvement comprising;
   securing means, said securing means being on the periphery of said bottom sheet layer.

2. The sorbent pad laminate of claim 1 wherein said bottom sheet layer is a thermoplastic material.

3. The sorbent pad laminate of claim 2 wherein said securing means is an elasticised member made from said bottom sheet layer by heat shrinking of an oriented polymer.

4. The sorbent pad laminate of claim 3, wherein said securing means are along at least a substantial portion of the periphery of said bottom sheet layer.

5. The sorbent pad laminate of claim 2 wherein said securing means is an elasticised member made from said bottom sheet layer by heat relief of orientation stresses produced by yirradiation and polymer orientation.

6. The sorbent pad laminate of claim 2 wherein said securing means is an elasticised member made from said bottom sheet layer by heating said sheet layer.

7. The sorbent pad laminate of claim 2 wherein said securing means is an elasticised member made from said bottom sheet layer by heat shrinking of an irradiated and oriented polymer.

8. The sorbent pad laminate of claim 1 wherein multiple securing means are along the periphery of said bottom pad laminate.

9. The sorbent pad laminate of claim 1 wherein said securing means is a string means movably secured to at least a substantial region of the periphery of said bottom sheet layer and having an unsecured region of said periphery, whereby access to said string means is provided at said unsecured region, thereby enabling a user to draw said string means and tie a knot.

10. The sorbent pad laminate of claim 9 wherein said securing means can be tightened to form a closed bag, said intermediate sorbent layer and said screen means being enclosed within said closed bag.

11. The sorbent pad laminate of claim 1 further comprising litter granules, said litter granules overlying said top claw resistant screen means.

12. The sorbent pad laminate of claim 11 wherein said litter granules are substantially non-urine sorbent.

13. The sorbent pad laminate of claim 1 further comprising adhering means, said adhering means being affixed to said sheet layer.

14. In the combination of an animal urine sorbent pad laminate means for use in combination with a cat litter device having a base and walls with said sorbent pad laminate means overlying said base, said laminate means comprising in combination;
   a. a bottom sheet layer of moisture impermeable material,
   b. an intermediate sorbent layer of material having a high sorbency capacity for urine, and
   c. a top claw resistant screen means, said screen means being a urine permeable, flexible member of material which is substantially inert to urine, formed of strands having sufficient tear strength to withstand the clawing action of a cat and sufficiently small hole size to protect said sorbent layer and said sheet layer of moisture impermeable material from being torn by animal claws,
   said bottom sheet layer and said top screen means being bonded to each other along at least a substantial portion of the periphery of said screen means, the improvement comprising:
   securing means, said securing means being along the periphery of said bottom sheet layer.

15. The combination of claim 14 wherein litter device is a self supporting structure.

16. The combination of claim 15 wherein said self supporting structure has a peripheral lip which curves outwardly and wherein said securing means overlies said lip.

17. The sorbent pad laminate of claim 16 wherein the length and width dimensions of said bottom sheet layer are greater than said self supporting cat litter container.

18. The sorbent pad laminate of claim 15 wherein said securing means is a string movably affixed to at least a substantial region of the periphery of said bottom sheet layer and having an unaffixe region, whereby access to said string means is provided at said unaffixed region, thereby enabling a user to draw said string means and tightened the string around the outer walls of said self supporting cat litter container.

19. The sorbent pad laminate of claim 18 wherein said string has a length substantially greater than the perimeter of said bottom sheet layer.

20. The sorbent pad laminate of claim 19 wherein said string means can be drawn and tightened to form a bag.

21. The sorbent pad laminate of claim 14 wherein said bottom sheet layer is in contact with said base and walls of said self supporting cat litter container.

22. The sorbent pad laminate of claim 21 wherein said securing means is in contact with the outside of said walls of said self supporting cat litter container.

23. The combination of claim 14 further comprising litter granules, said litter granules overlying said top claw resistant screen means.

24. The combination of claim 23 wherein said litter granules are substantially non-urine sorbent.

25. The sorbent pad laminate of claim 24 wherein said adhering means is pressure sensitive adhesive.

26. The sorbent pad laminate of claim 14 wherein said securing means is an elasticised member with an elasticised diameter less than that of the outside walls of said self supporting cat litter container.

27. The combination of claim 14 further comprising adhering means, said adhering means being affixed to said sheet layer.

28. The combination of claim 27 wherein said adhering means removably affixes said sorbent pad laminate means to said litter device and prevents relative movement between said sorbent pad and said litter device which can be caused by the clawing action of an animal.

* * * * *